US009594904B1

(12) United States Patent
Jain et al.

(10) Patent No.: US 9,594,904 B1
(45) Date of Patent: Mar. 14, 2017

(54) DETECTING MALWARE BASED ON REFLECTION

(71) Applicant: FireEye, Inc., Milpitas, CA (US)

(72) Inventors: Varun Jain, Milpitas, CA (US); Abhishek Singh, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 7 days.

(21) Appl. No.: 14/694,796

(22) Filed: Apr. 23, 2015

(51) Int. Cl.
G06F 12/14      (2006.01)
H04L 29/06      (2006.01)
G06F 11/30      (2006.01)
G06F 21/56      (2013.01)
G06N 99/00      (2010.01)

(52) U.S. Cl.
CPC .......... *G06F 21/562* (2013.01); *G06F 21/563* (2013.01); *G06N 99/005* (2013.01); *H04L 63/145* (2013.01); *G06F 2221/033* (2013.01)

(58) Field of Classification Search
CPC ................. G06F 21/562; G06F 21/563; G06F 2221/033; H04L 63/145; G06N 99/005
USPC ...................... 726/23, 24; 713/167, 187, 188
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Marchette, David J., Computer Intrusion Detection and Network Monitoring: A Statistical ("Marchette"), (2001).

(Continued)

*Primary Examiner* — Aravind Moorthy
(74) *Attorney, Agent, or Firm* — Rutan & Tucker, LLP

(57) ABSTRACT

According to one embodiment of the disclosure, a computerized method is described to detect a malicious object through its attempt to utilize reflection. The computerized method comprises receiving, by a network device, an object for analysis. Thereafter, the network device conducts a first analysis within a sandboxed environment. The first analysis determines whether the object is configured to utilize reflection. According to one embodiment, the first analysis involves analysis of the content of the object by a static analysis engine. Alternatively, or in addition to this analysis, the behavior of the object by an attempt to access a reflection API may determine that the object is utilizing reflection. Responsive to the network device determining that the object utilizes reflection, a second analysis is conducted to determine whether the object is malicious.

25 Claims, 7 Drawing Sheets

(56) References Cited

U.S. PATENT DOCUMENTS

| | | |
|---|---|---|
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,072 B2 | 6/2012 | Matulic |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,198 B2 | 10/2012 | Mott et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,240 B2 | 11/2012 | Lorsch |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,401,982 B1* | 3/2013 | Satish .................. G06F 21/566 706/12 |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |

(56) References Cited

U.S. PATENT DOCUMENTS

| | | |
|---|---|---|
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,165,142 B1 * | 10/2015 | Sanders ............... G06F 21/566 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191864 A1 * | 10/2003 | Govindaraja-puram ............... G06F 9/4425 719/310 |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |

(56) References Cited

U.S. PATENT DOCUMENTS

| | | |
|---|---|---|
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209401 A1* | 8/2008 | Fanning ............ G06F 11/3628 717/124 |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0263669 A1* | 10/2008 | Alme ................ G06F 21/56 726/24 |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078790 A1* | 3/2011 | Fazunenko ............ G06F 9/468 726/22 |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314270 A1* | 12/2011 | Lifliand ............ H04L 63/0428 713/151 |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0159454 A1* | 6/2012 | Barham ............ G06F 9/45558 717/128 |
| 2012/0174186 A1 | 7/2012 | Aziz et al. |

(56) References Cited

U.S. PATENT DOCUMENTS

| | | | |
|---|---|---|---|
| 2012/0174196 A1 | 7/2012 | Bhogavilli et al. | |
| 2012/0174218 A1 | 7/2012 | McCoy et al. | |
| 2012/0174224 A1* | 7/2012 | Thomas | G06F 21/566 |
| | | | 726/24 |
| 2012/0198279 A1 | 8/2012 | Schroeder | |
| 2012/0210423 A1 | 8/2012 | Friedrichs et al. | |
| 2012/0222121 A1 | 8/2012 | Staniford et al. | |
| 2012/0255015 A1 | 10/2012 | Sahita et al. | |
| 2012/0255017 A1 | 10/2012 | Sallam | |
| 2012/0260342 A1 | 10/2012 | Dube et al. | |
| 2012/0266244 A1 | 10/2012 | Green et al. | |
| 2012/0278886 A1 | 11/2012 | Luna | |
| 2012/0297489 A1 | 11/2012 | Dequevy | |
| 2012/0330801 A1 | 12/2012 | McDougal et al. | |
| 2013/0014259 A1 | 1/2013 | Gribble et al. | |
| 2013/0036472 A1 | 2/2013 | Aziz | |
| 2013/0047257 A1 | 2/2013 | Aziz | |
| 2013/0055338 A1* | 2/2013 | McDougal | G06F 21/56 |
| | | | 726/1 |
| 2013/0074185 A1 | 3/2013 | McDougal et al. | |
| 2013/0086684 A1 | 4/2013 | Mohler | |
| 2013/0097699 A1 | 4/2013 | Balupari et al. | |
| 2013/0097706 A1 | 4/2013 | Titonis et al. | |
| 2013/0111587 A1 | 5/2013 | Goel et al. | |
| 2013/0117852 A1 | 5/2013 | Stute | |
| 2013/0117855 A1 | 5/2013 | Kim et al. | |
| 2013/0139264 A1 | 5/2013 | Brinkley et al. | |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1* | 6/2013 | Madou | G06F 11/3688 |
| | | | 726/25 |
| 2013/0167236 A1 | 6/2013 | Sick | |
| 2013/0174214 A1 | 7/2013 | Duncan | |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1 | 5/2014 | Lukacs et al. | |
| 2014/0169762 A1 | 6/2014 | Ryu | |
| 2014/0179360 A1 | 6/2014 | Jackson et al. | |
| 2014/0328204 A1 | 11/2014 | Klotsche et al. | |
| 2014/0337836 A1 | 11/2014 | Ismael | |
| 2014/0351935 A1 | 11/2014 | Shao et al. | |
| 2014/0359761 A1* | 12/2014 | Altman | H04L 63/1425 |
| | | | 726/22 |
| 2015/0096025 A1 | 4/2015 | Ismael | |
| 2015/0301837 A1* | 10/2015 | Goetz | G06F 9/44521 |
| | | | 717/148 |
| 2016/0092684 A1* | 3/2016 | Langton | G06F 21/567 |
| | | | 726/23 |

FOREIGN PATENT DOCUMENTS

| | | |
|---|---|---|
| WO | 0206928 | 1/2002 |
| WO | 0223805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Margolis, P.E., "Random House Webster's 'Computer & Internet Dictionary 3rd Edition", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Peter M. Chen, and Brian D. Noble, "When Virtual is Better Than Real, Department of Electrical Engineering and Computer Science", University of Michigan ("Chen").

Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/~casado/pcap/sectionl.html, (Jan. 6, 2014).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Mathew M., "Throttling Virses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

(56) References Cited

OTHER PUBLICATIONS

"Network Security: NetDetector—Network Intrusion Forensic System (NIFS) Whitepaper", ("NetDetector Whitepaper"), (2003).
"Packet", Microsoft Computer Dictionary Microsoft Press, (Mar. 2002), 1 page.
"When Virtual is Better Than Real", IEEEXplore Digital Library, available at, http://ieeexplore.ieee.org/xpl/articleDetails.jso?reload=true&arnumber=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).
Adobe Systems Incorporated, "PDF 32000-1:2008, Document management—Portable document format—Part1:PDF 1.7", First Edition, Jul. 1, 2008, 756 pages.
AltaVista Advanced Search Results. "attack vector identifier" Http://www.altavista.com/web/results?ltag=ody&pg=aq &aqmode=aqa=Event+Orchestrator . . . , (Accessed on Sep. 15, 2009).
AltaVista Advanced Search Results. "Event Orchestrator". Http://www.altavista.com/web/results?ltag=ody&pg=aq &aqmode=aqa=Event+Orchesrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Aziz, Ashar, System and Method for Malware Containment, U.S. Appl. No. 14/620,060, filed Feb. 11, 2015, non-Final Office Action dated Apr. 3, 2015.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "Extracting syslog data out of raw pcap dumps, seclists.org, Honeypots mailing list archives", available at http://seclists,org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cisco, Configuring the Catalyst Switched Port Analyzer (SPAN) ("Cisco"), (1992-2003).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05 Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., ""Zlib compressed data format specification version 3.3" RFC 1950, (1996)".
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review vol. 42 Issue 3, pp. 21-28.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek-.com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase © CMU, Carnegie Mellon University, 2007.
Hjelmvik, Erik, "Passive Network Security Analysis with NetworkMiner", (In)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc&ResultC . . . (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King").
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College, ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.

(56) References Cited

OTHER PUBLICATIONS

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].

* cited by examiner

DETECTING MALWARE BASED ON REFLECTION

FIELD

Embodiments of the disclosure relate to the field of cyber security. More specifically, embodiments of the disclosure relate to a system and method for detecting malware utilizing reflection for obfuscation.

GENERAL BACKGROUND

Malicious software ("generally referred to as "malware") has become a pervasive problem for corporations and individual users alike, as the functionality of most networked resources is based on downloaded software. The presence of malware within downloaded software may compromise a networked resource and the network itself. A number of techniques have been used by malware authors to obfuscate the analysis of their malware within downloaded content.

Currently, security appliances are not equipped to consistently detect malware when obfuscated by malware authors using advanced programmatic techniques.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
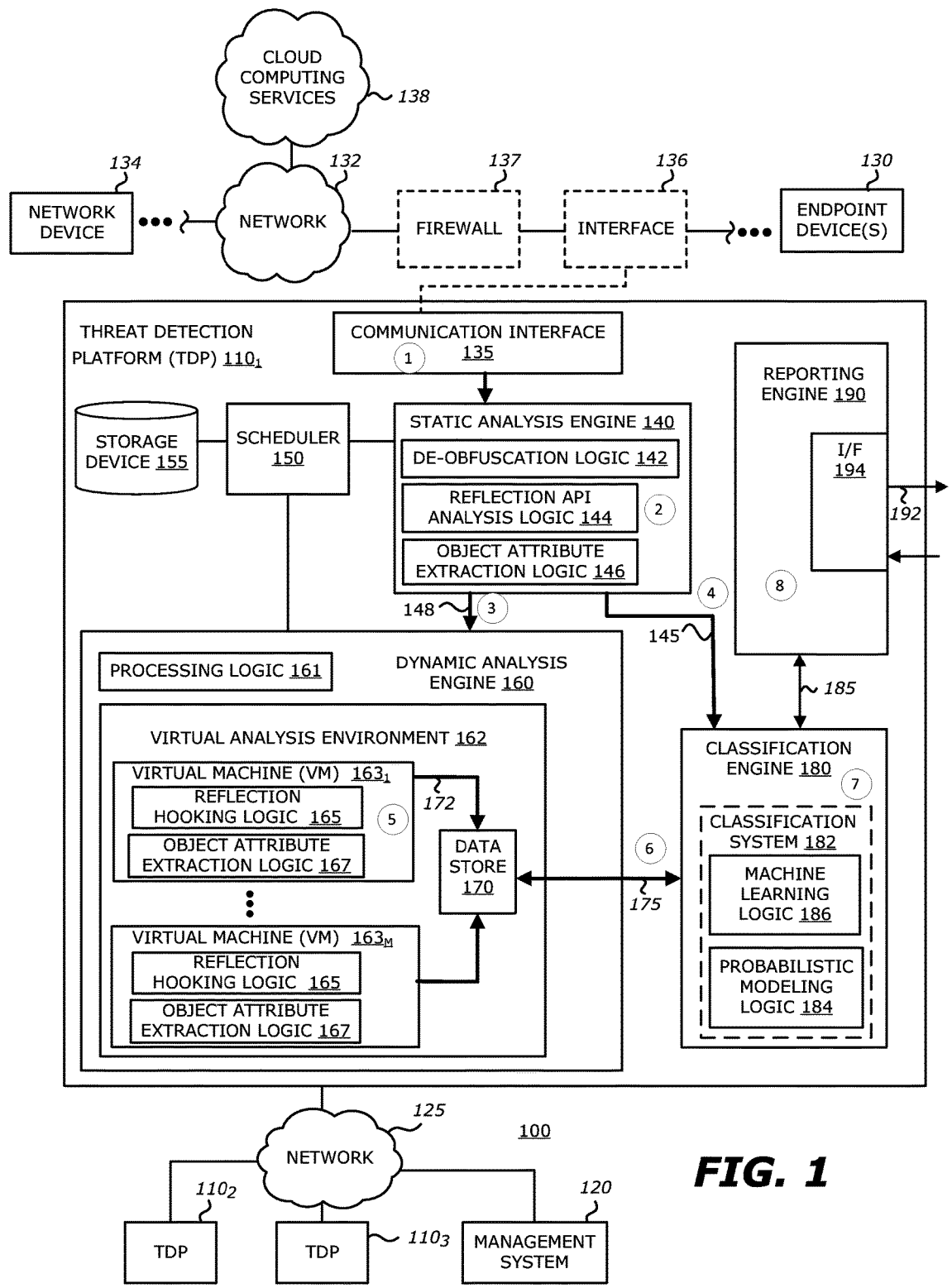
FIG. 1 is a first illustrative embodiment of a threat detection platform (TDP) deployed within a network that detects malware that uses reflection for obfuscation.

Various embodiments of the disclosure relate to a platform that is implemented with logic configured to (i) analyze the content of an object to determine whether the object is configured to issue a function call that invokes reflection operations, and/or (ii) detect whether the object, when processed, issues a function call that invokes reflection operations. The functionality of this logic is directed to uncover malware that relies on reflection for obfuscation purposes.

In general, "reflection" represents an ability to examine or modify run-time behaviors of a particular object. As an example, in object oriented programming languages such as JAVA®, reflection allows for inspection of software components, such as interfaces as well as source code constructions (e.g., classes) at run-time, without knowing the names of these software components at compile time.

As an illustrative embodiment, such detection may involve a determination as to whether an object under analysis (sometimes referred to as a "suspect object") is configured to or is attempting to access one or more application programming interfaces (APIs) that invoke reflection operations (hereinafter "reflection APIs"). In response to determining that the object is configured to or is attempting to access a reflection API, an analysis of one or more features of the object may be conducted to determine whether the object may be associated with a malicious attack. This analysis may involve probabilistic modeling analysis and/or machine learning analysis, as described below.

More specifically, a threat detection platform (TDP) may be deployed to conduct a first analysis of a suspect object to determine whether the suspect object is configured to issue a function call that invokes reflection operations, such as an API call to a reflection API for example. According to one embodiment of the disclosure, a static analysis engine of the TDP may be configured to conduct an operation (e.g., de-obfuscation such as decompiling and/or disassembling incoming data or even emulation) to recover content from the suspect object. The content may be part of a high-level representation of the object, such as at least a portion of source code, pseudo-code, or another human readable format. Thereafter, the content may be analyzed in efforts to detect the presence of one or more function calls that, during run-time, would invoke reflection operations.

For example, the static analysis engine may be configured to decompile an object, such as an executable file for example, to recover source code. Thereafter, the static analysis engine analyzes the source code to determine if the source code includes a function call that invokes reflection operations. For instance, the source code may include an API call to a predetermined reflection API. Upon completion of a scan of the source code (e.g., an examination without execution) and detection of a function call that invokes reflection operations (e.g., an API call to a reflection API), the object is determined to be suspicious. The object is deemed "suspicious" when there exists at least a first level of likelihood of the object being associated with a malicious attack.

Additionally, or in the alternative, reflection can be identified by implementing logic within a dynamic analysis engine of the TDP. During virtual processing of the suspect object, the logic may be adapted to set interception points (e.g., hooks, breakpoints, etc.) that are used to detect the presence of one or more function calls that invoke reflection operations (e.g., particular API or system calls, etc.). Hence, in response to detecting a function call that invokes reflection operations, logic within the dynamic analysis engine determines that the object is "suspicious".

After the object is deemed "suspicious" in response to determining that the content associated with the object includes a function call or determining that the object issues a function call that invokes reflection operations, the static analysis engine and/or the dynamic analysis engine provides the suspicious object and/or particular features associated with the suspicious object to the classification system for a more in-depth analysis. Deployed within the security appliance or in a remotely located resource, the classification system is configured to determine whether the suspicious object is "malicious," namely the system determines whether there is a prescribed likelihood (higher than the first level of likelihood) of the object being associated with a malicious attack. In general, it is contemplated that the classification system may not be accessed unless the suspect object (i) is configured to issue a function call that invokes reflection operations or (ii) has issued a function call that invokes reflection operations.

According to one embodiment of the disclosure, the classification system determines whether the object is malicious by applying a probabilistic model analysis to one or more features (herein "feature(s)") extracted from the suspicious object after analysis by the static analysis engine and/or the dynamic analysis engine. These feature(s) may include, but are not limited or restricted to metadata (e.g., function names and/or object size), parameters passed (or to be passed) with an intended function call, and/or other information potentially indicative of malware such as suspicious data strings from content of the object if the object has been successfully de-obfuscated. It is contemplated that the feature(s) may further include information associated with behaviors that constitute abnormalities such as a reflection API downloading a file or executing a file.

The classification system may, in addition, or in the alternative, apply a machine learning analysis to the feature(s) associated with the suspicious object. Machine learning analysis includes an operation of comparing the feature(s), either individually or as a pattern of two or more features, to data that is known to be malicious or non-malicious (e.g., benign). This comparison determines whether the suspicious object is malicious or non-malicious.

The results of the probabilistic model analysis, the machine learning analysis, or a combination of these analyses produces a result that identifies whether the suspicious object is deemed to be malicious or non-malicious.

I. Terminology

In the following description, certain terminology is used to describe aspects of the invention. For example, in certain situations, both terms "logic" and "engine" are representative of hardware, firmware and/or software that is configured to perform one or more functions. As hardware, logic (or engine) may include circuitry having data processing or storage functionality. Examples of such processing or storage circuitry may include, but is not limited or restricted to a (hardware) processor; one or more processor cores; a programmable gate array; a microcontroller; an application specific integrated circuit; receiver, transmitter and/or transceiver circuitry; storage medium including semiconductor memory or a drive; or combinatorial logic, or combinations of one or more of the above components.

Logic (or engine) may be in the form of one or more software modules, such as executable code in the form of an executable application, an application programming interface (API), a subroutine, a function, a procedure, an applet, a servlet, a routine, source code, object code, a shared library or dynamic-link library (dll), or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device; and/or a semiconductor memory. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. For instance, the object may be a file (e.g., Portable Document Format "PDF" document, or Microsoft® Word® or other word processing document), or HyperText Markup Language "HTML" based web page, or the like. During analysis, for example, the object may exhibit or a program processing the object may exhibit one or more behaviors that are systematic of malicious activity and provide evidence that the object may be classified as malicious. One of these behaviors may include issuance of a function call that invokes one or more reflection operations.

One example of a function call that invokes reflection operations is an API call to access a reflection API (e.g., an API call to "Class.forName(X)" that causes the class named "X", namely a programming construct with particular function to be dynamically loaded at run-time). Another example of a function call that invokes reflection operations may be a system call, normally based on an API call, where the called system function invokes reflection operations.

A "platform" generally refers to an electronic device with connectivity to an external data source (e.g., network, other electronic device, etc.) that typically includes a housing that protects, and sometimes encases, circuitry with data processing and/or data storage. Examples of a platform may include a server, a dedicated security appliance, or an endpoint device which may include, but is not limited or restricted to a stationary or portable computer including a desktop computer, laptop, netbook or tablet; a smartphone; a video-game console; or wearable technology (e.g., smart watch, etc.).

The term "transmission medium" is a physical or logical communication path with an endpoint device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, or operations are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. General Architecture

Referring to FIG. 1, an exemplary block diagram of a network 100 deploying a plurality of threat detection platforms (TDP) 110$_1$-110$_N$ (N>1, where N=3 for this embodiment) communicatively coupled to a management system 120 via a network 125 is shown. In general, the management system 120 is adapted to manage each TDP 110$_1$-110$_3$. For instance, the management system 120 may be configured to perform content updates within a processing engine operating as part of a communication interface 135, a static analysis engine 140, a dynamic analysis engine 160, a classification engine 180, and/or a reporting engine 190 with an optional user interface capability. For example, the content update may include a software or firmware update that alters the functionality of the TDP $110_1$. Alternatively, the content update may include security content, such as signatures or rules changes (e.g., add/delete/modify signatures, rules or parameters that are utilized by the rules, etc.). The static analysis engine 140 and/or the dynamic analysis engine 160 may use the signatures and/or rules to detect whether reflection operations are invoked and whether the reflection operations are directed to malicious activities.

As shown in FIG. 1, a first threat detection platform (TDP) $110_1$ is an electronic device that is adapted to analyze information associated with incoming data (e.g., network traffic propagating over a communication network 132, input data from another type of transmission medium including a dedicated transmission medium, etc.). As this illustrative embodiment, the first TDP $110_1$ is communicatively coupled with the communication network 132 via an interface 136, where the communication network 132 may include a public network such as the Internet, a private network (e.g., a local area network "LAN", wireless LAN, etc.), or a combination thereof. The interface 136 operates as a data capturing device that intercepts (or alternatively duplicates) at least a portion of the data associated with an object, which may include metadata. Alternatively, although not shown, the interface 136 may be configured to receive files or other objects that are not provided over a network. For instance, as an example, the interface 136 may be a data capturing device that automatically (or on command), accessing data stored in a storage system or another type of interface, such as a port, for receiving objects manually provided via a suitable dedicated communication link or from storage media such as portable flash drives.

In some embodiments, although not shown, interface 136 may be contained within the first TDP $110_1$. In other embodiments, the interface 136 can be integrated into an intermediary device in the communication path (e.g., an optional firewall 137, router, switch or other networked electronic device) or can be a standalone component, such as an appropriate commercially available network tap.

For this illustrative embodiment, however, the interface 136 may be configured to capture data associated with an incoming object for analysis, and perhaps its corresponding metadata (or generate metadata based on the captured data). The metadata may be used, at least in part, to determine protocols, application types and other information that may be used by logic (e.g., scheduler 150 or a virtual machine monitor not shown) within the first TDP $110_1$ to determine particular software profile(s) used for virtual machine (VM) configuration and/or VM operation scheduling. For instance, the software profile(s) may be used for selecting and/or configuring one or more virtual machines (VMs) $163_1$-$163_M$ (M≥1) within a virtual analysis environment 162 of the dynamic analysis engine 160. These software profile(s) may be directed to different software or different versions of the same software application extracted from software image(s) fetched from a storage device 155. Additionally, the metadata may be used, at least in part, as the feature(s) that are evaluated by a classification system 182 within the classification engine 180 in determining whether the object under analysis is malicious or not.

As further shown in FIG. 1, the first TDP $110_1$ includes communication interface 135, static analysis engine 140, scheduler 150, storage device 155, dynamic analysis engine 160, classification engine 180, and/or reporting engine 190. Herein, according to this embodiment of the disclosure, the communication interface 135 receives an object and converts that object into a format, as need or appropriate, on which scanning may be conducted by the static analysis engine 140 (see operation (1)). This conversion may involve decompression of the object for example. It is contemplated that the communication interface 135 may conduct decompilation, disassembly or other de-obfuscation activities on the object and/or extraction of specific data associated with the object; however, according to this embodiment as described below, the de-obfuscation and data extraction activities may be handled by logic within the static analysis engine 140.

As shown in FIG. 1, the static analysis engine 140 comprises de-obfuscation logic 142, reflection API analysis logic 144, and/or feature extraction logic 146 (and their collective operations are illustrated as operation (2)). The de-obfuscation logic 142 is configured to de-obfuscate at least a portion of an incoming object received from the communication interface 135. As an example, the de-obfuscation logic 142 may be configured to de-obfuscate, such as decompile and/or disassemble, at least a portion of the incoming object (e.g., an executable) to recover a high-level representation of the object. The high-level representation may be in the form of source code, pseudo-code, or another high-level language.

After de-obfuscation, the reflection API analysis logic 144 may analyze content that is part of the high-level representation of the object for the presence of one or more API calls to any reflection API. In response to determining that the suspect object includes content that, at run-time, would issue an API call to one of the reflection APIs, the feature extraction logic 146 may extract feature(s) from the high-level representation (e.g., source code, or pseudo-code or another high-level language), such as called function names, data associated with the size of the object, information associated with one or more post infection behaviors, or the like. According to this embodiment of the disclosure, the extracted feature(s) may be provided as static analysis (SA)-based results 145 to the classification system 182 of the classification engine 180 for subsequent analysis.

It is contemplated that the static analysis engine 140 may further include processing circuitry that is responsible for extracting and/or generating metadata contained within or otherwise associated with incoming data from the communication interface 135 (e.g., network traffic, downloaded data). This metadata may be subsequently used for configuring one or more VMs $163_1$-$163_M$ within a virtual analysis environment 162 for conducting a dynamic analysis of the object 148 associated with that metadata.

Referring still to FIG. 1, the reflection API analysis logic 144 of the static analysis engine 140 analyzes content within the object, which may be a portion of network traffic (or downloaded data) according to this embodiment of the disclosure. Such analysis may involve the performance of one or more checks on content associated with the object, namely content that is part of the high-level representation of the object, without execution of the object. Examples of the checks may include signature checks, which may involve a comparison of content that is part of the high-level representation of the object to one or more pre-stored signatures, which may include one or more reflection API function names.

After scanning the content of the suspect object, the reflection API analysis logic 144 determines whether or not this object is "suspicious" based on whether content within the high-level representation includes an API call to a reflection API. As a result, the static analysis engine 140 may pass this suspicious object 148 to the dynamic analysis engine 160 for more in-depth analysis in a VM-based analysis environment 162 (see operation (3)). Additionally, or in the alternative, the reflection API analysis logic 144 may signal the feature extraction logic 146 to obtain one or more features associated with the suspect object and provide such feature(s) 143 to the classification engine 180 as part of SA-based results 145 (see operation (4)).

Additionally, after analysis of the object has been completed, the static analysis engine 140 may provide some or all of the incoming object as the suspicious object 148 to the dynamic analysis engine 160 for in-depth dynamic analysis by one or more VMs $163_1$-$163_M$ of the virtual analysis environment 162. For instance, according to one embodiment of the disclosure, a first VM $163_1$ may be adapted to process the suspicious object 148. Logic within the dynamic analysis engine 160 (e.g., reflection hooking logic 165 within the first VM $163_1$) may be configured to monitor for certain types of behaviors exhibited by the suspicious object 148 during processing within the first VM $163_1$. One type of behavior may include the object 148 invoking reflection operations through one or more API calls to a reflection API. Another type of behavior may include detection of a system call (or, where a virtualization layer include a hypervisor is employed in an embodiment, a hyper call) that invokes reflection operations, where the system call (or hyper call) may be issued (or triggered) by the suspicious object 148 at run-time and may be based on an API call.

Herein, according to one embodiment, the first VM $163_1$ is configured to process the suspicious object 148. The reflection hooking logic 165 may be used to set one or more hooks at one or more reflection APIs or equivalent operating system (e.g., guest or host OS) functions that may perform or invoke reflection operations, where the hooks redirect the operational flow such as redirecting operations via a JUMP instruction to the classification system as described below (see operation (5)). Examples of these reflection APIs may include, but are not limited or restricted to getClass( ) API or Class.forName( ), which are responsible for finding a class associated with the object.

Upon determining that the object 148 is issuing function calls to access an API or OS function that invokes reflection operations, the object feature extraction logic 167 may be activated to extract one or more features 172 (e.g., arguments, etc.) from the function call(s). Similarly, these feature(s) 172 may include a name of the function identified in the function call and/or other data within the arguments of the function call issued (or triggered) by the object 148 during processing within the first VM $163_1$. The feature(s) 172 may be stored in data store 170 and are subsequently provided to (or accessible by) the classification system 182 as part of VM-based results 175.

Referring still to FIG. 1, the scheduler 150 may be adapted to configure one or more VMs $163_1$-$163_M$ based on metadata associated with the suspicious object 148 in order to conduct run-time processing of the suspicious object 148 within the configured VMs $163_1$-$163_M$. For instance, the first VM $163_1$ and a second VM $163_2$ may be configured to run concurrently (i.e. overlapping at least in part in time), where each VM $163_1$ and $163_2$ being configured with a different software profile corresponding to software images stored within storage device 155. As an alternative embodiment, the first VM $163_1$ may be configured to run plural processes concurrently or sequentially, each process configured according to a software configuration that may be used by different electronic devices connected to a particular enterprise network (e.g., endpoint device(s) 130) or a prevalent type of software configuration (e.g., a particular version of Windows® OS and/or a particular version of a web browser with a particular application plug-in). It is contemplated that the VM configuration described above may be handled by logic other than the scheduler 150.

According to one embodiment of the disclosure, the dynamic analysis engine 160 may be adapted to execute one or more VMs $163_1$-$163_M$ that each simulate processing of the suspicious object 148 within a run-time environment. For instance, dynamic analysis engine 160 may include processing logic 161 to provide anticipated signaling to the VM(s) $163_1$, . . . , and/or $163_M$ during virtual processing of the suspicious object 148, and as such, emulate a source of and/or destination for communications with the suspicious object 148 while processed within the VM(s) $163_1$, . . . , and/or $163_M$. As an example, the processing logic 161 may be adapted to operate by providing simulated key inputs from a keyboard, keypad or touch screen, as requested by the suspicious object 148 during run-time.

Referring still to FIG. 1, the static analysis engine 140 may be adapted to provide SA-based results 145 to the classification system 182 while the dynamic analysis engine 160 may be adapted to provide the VM-based results 175 to the classification system 182 (see operations (4, 6)). According to one embodiment of the disclosure, the SA-based results 145 may include information obtained by analyzing the incoming object that is potentially indicative of malware (e.g., function names, object size, suspicious strings within the object 148). Similarly, the VM-based results 175 may include information associated with the object 148 as well as the function calls that invoke reflection operations (e.g., function names or other argument data associated with the functions calls).

According to one embodiment of the disclosure, the classification engine 180 includes the classification system 182 that is configured to receive the SA-based results 145 and/or the VM-based result 175 associated with the object under analysis. Based at least partially on the SA-based results 145 and/or VM-based results 175, the classification system 182 evaluates the feature(s) within the SA-based results 145 and/or VM-based results 175 to determine whether the suspicious object 148 should be classified as "malicious" (see operation (7)).

For instance, as an illustrative embodiment, the SA-based results 145 include one or more features that are provided to probabilistic modeling logic 184. The probabilistic modeling logic 184 is configured as a decision-tree analysis scheme, which receives one or more features as input, either individually or as a pattern of two or more features, and produces a result that may be used to identify whether the object is associated with a malicious attack.

According to one embodiment, the result may identify a risk level that indicates a likelihood of the object being associated with a malicious attack. For instance, the risk level may be identified in a variety of manners. For instance, the risk level may be conveyed by a two-state result that simply represents the object as malicious or non-malicious. Another risk level may be conveyed through a tri-state result (high, medium, low) to identify various probabilities of the object being associated with the malicious attack and obfuscated by reflection. Yet another risk level may be conveyed using scores that provide a greater granularity as to the likelihood of the object being associated with a malicious attack and obfuscated by reflection.

As an illustrative example, the result may include an overall score that is formed by an aggregation of scores (e.g., prescribed values) for some or all of the features undergoing analysis by the probabilistic modeling logic 184. Herein, the name of a function call directed to a particular reflection API that is detected within the de-obfuscated content of the object may be assigned a first score. Similarly, the name of a system function that invokes reflection operations and is extracted from a system call detected during virtual processing of the object 148 may be assigned a second score different than the first score. Again, the size of the object may be assigned a third score, which is different than the first and second scores. The aggregation of these scores may be used to compute an overall score, which represents the likelihood of the object being malware that is obfuscated through reflection.

As an illustrative example, suppose that the object under static analysis is a file having a filename entitled "2014_IRS_TAX_INQUIRY" with a size of 15 megabytes and including content that represents a function call to a reflection API (e.g., getClass( )). According to this probabilistic modeling analysis, an aggregate value (e.g., a score greater than or equal to 8 out of a maximum 10) denotes that the object 148 is malicious. The probabilistic model logic 184 may include a portion of the decision-tree analysis that includes the following:

If object_content_string=string 'getClass'
        Score+=Score+4;
    If filename string>8
        if first_char=char '[0-9]'
            Score+=Score+2.5
        if first_char=char '[A-Z]"
            Score+=Score+1.5
    If filesize>10 megabytes
        Score+=Score+2

Based at least in part on the one or more features associated with the object, a determination may be made by the probabilistic modeling logic 184 of the classification system 182 as to whether or not the object that invokes reflection is associated with a malicious attack. Upon determining that the object is associated with a malicious attack, the classification system 182 may provide information to identify the malicious object, including the resultant score and/or one or more of the features provided as part of the SA-based results 145, to the reporting engine 190.

As another illustrative embodiment, if provided in lieu of or in addition to SA-based results 145, the VM-based results 175 may include one or more features 172 that are provided to probabilistic modeling logic 184 based on monitored behaviors during processing of the object 148 within the first VM 163₁. According to this illustrative example, the probabilistic model logic 184 assigns a risk level to the object 148 under dynamic analysis. For a file having a filename (2014_IRS_TAX_INQUIRY) with a size of 15 megabytes and including content (e.g., a code that initiates a function call to access the reflection API such as getClass( )), the probabilistic modeling logic 184 may assign a risk level (e.g., aggregate score of at least 8 out of a maximum 10) that denotes that the object 148 is malicious. For this example, the probabilistic model logic 184 may include a portion of the decision-tree analysis that includes the following:

If call = getClass( )
        Score += Score + 4;

if filename string > 8
        if first_char = char '[0-9]'
            Score += Score + 2.5
        if first_char = char '[A-Z]"
            Score += Score +1.5
    if filesize > 10 megabytes
        Score += Score + 2

For this illustrated embodiment, based at least in part on the feature(s) associated with the object 148, a determination may be made by the probabilistic modeling logic 184 of the classification engine 180 as to whether or not the object 148 is associated with a malicious attack. Upon determining that the object 148 is associated with a malicious attack (when Score≥8), the classification engine 180 may provide information to identify the malicious object, including one or more of the features 172 or the resultant score, to the reporting engine 190.

As shown in FIG. 1, the reporting engine 190 is configured to receive information 185 from the classification engine 180 and generate alerts 192, especially in response to the suspicious object being now classified as malicious (see operation (8)). The alerts may include various types of messages, which may include text messages and/or email messages, video or audio stream, or other types of information over a wired or wireless communication path. The reporting engine 190 features an optional user interface 194 (e.g., touch pad, keyed inputs, etc.) for customization as to the reporting configuration.

In addition, or in the alternative to probabilistic modeling logic 184, the classification engine 180 may comprise machine learning logic 186. Machine learning logic 186 performs an analysis of the one or more features that are part of the SA-based results 145 and/or the one or more features that are part of the VM-based results 175. These features are compared, either individually or as a pattern of two or more features, to data known to be malicious or non-malicious (e.g. benign). The comparison is conducted to determine whether the object under analysis is malicious. Upon determining that the object is malicious (i.e., associated with a malicious attack), the classification engine 180 may provide information to identify the malicious object, such as one or more of the features from the SA-based results 145 and/or the VM-based result 175 and/or resultant score, to the reporting engine 190.

Figure 2:
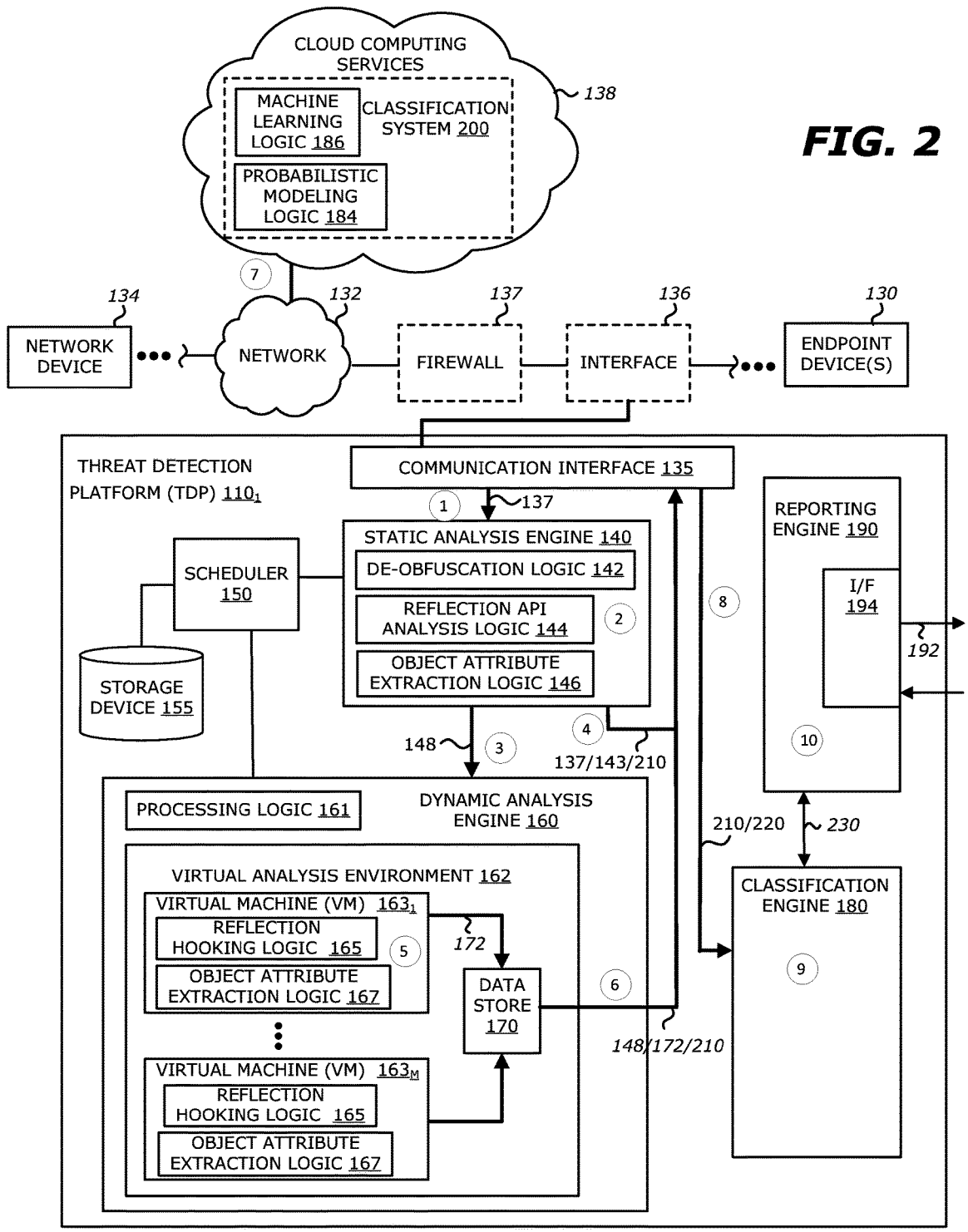
FIG. 2 is a second illustrative embodiment of the TD) deployed within a network that operates in combination with remote sources to detect malware that uses reflection for obfuscation.

Referring now to FIG. 2, according to another embodiment of the disclosure, the static analysis engine 140 and/or dynamic analysis engine 160 located within the first TDP 110₁ may determine that the object is suspicious when the object is configured to invoke or invokes reflection operations, as described above (see operations 1-2 & 4-5). However, located remotely from the first TDP 110₁, such as part of a cloud computing service 138 or within a different enterprise network for example, a classification system 200 is configured to receive an identifier 210 for the object along with (i) the object 137 and/or one or more features 143; (ii) object 148 and/or one or more features 172; or any combination thereof (see operations 3, 6 and 7). The identifier 210 may include any value that is considered to be unique, such as a hash result (e.g., MD5 hash value) for example.

Including the probabilistic modeling logic 184 and/or machine learning logic 186, the classification system 200 determines whether the object 148 is malicious and returns a result 220 of its probabilistic analysis or machine learning analysis (described above) along with the identifier 210 to the classification engine 180 (see operation 8).

Upon determining that the object 137 or 148 is associated with a malicious attack, the classification engine 180 may provide information 230 to identify the malicious object, including one or more of the features 143 or 172 and/or the result 220 (e.g., resultant score value), to the reporting engine 190. Upon determining that the object 137 or 148 is benign, the classification engine 180 may provide information 230 to identify the object and that the object is benign, including the result 220, to the reporting engine 190. In lieu of reporting benign objects, the classification engine 180 may merely report malicious objects to the reporting engine 190 (see operation 9).

As still shown in FIG. 2, the reporting engine 190 is configured to receive information from the classification engine 180 and generate alerts 192, especially in response to the suspicious objects that have now been classified as malicious (see operation 10).

III. Exemplary Logic Layout of TDP

Figure 3:
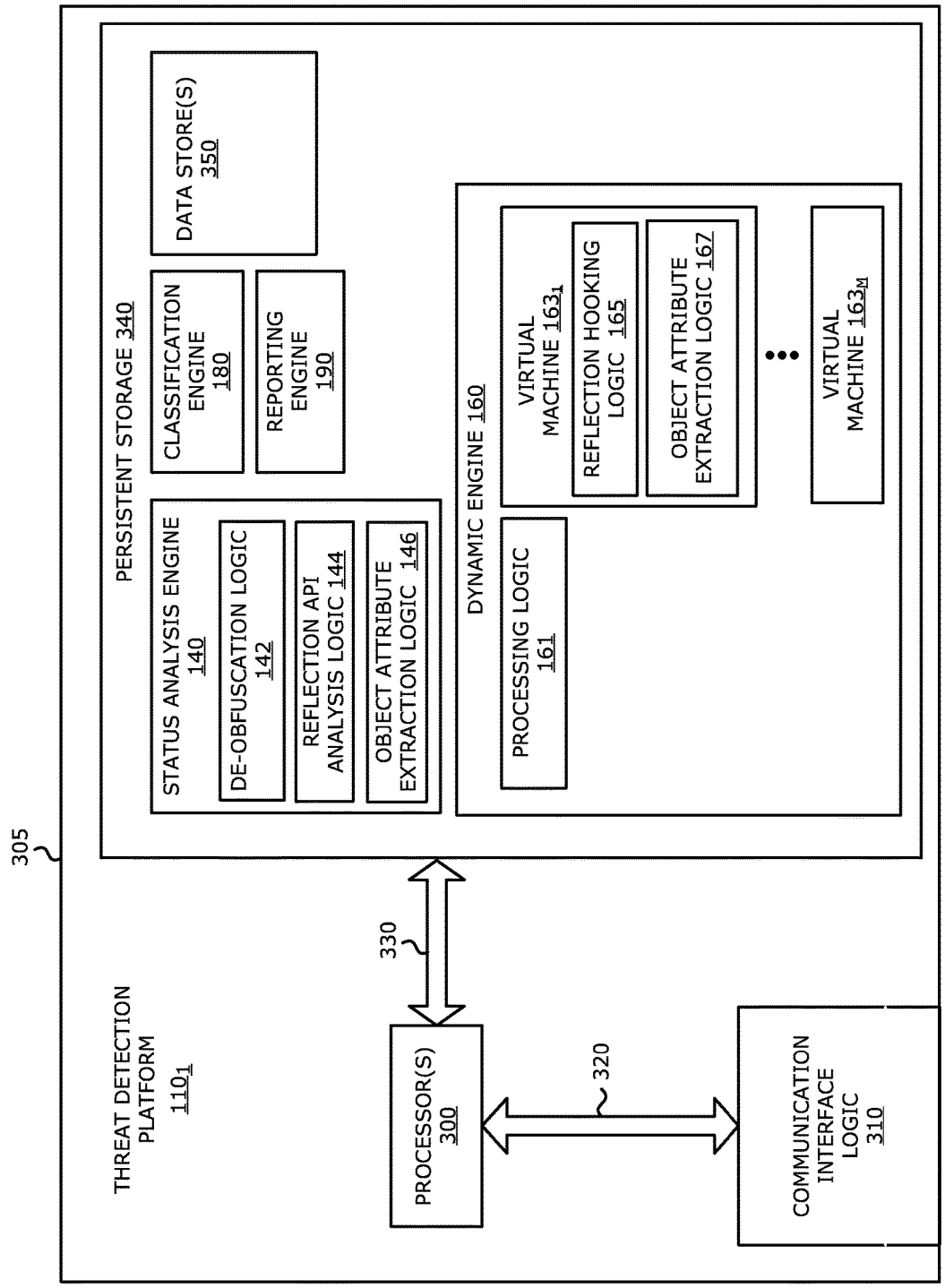
FIG. 3 is an exemplary embodiment of a logical representation of the TDP of FIG. 1.

Referring now to FIG. 3, an exemplary embodiment of a logical representation of the first TDP $110_1$ is shown. The first TDP $110_1$ includes a housing 305, which is made entirely or partially of a rigid material (e.g., hardened plastic, metal, glass, composite or any combination thereof) that protect circuitry within the housing 305, namely one or more processors 300 that are coupled to communication interface logic 310 that is part of communication interface 135 of FIGS. 1-2 via a first transmission medium 320. Communication interface logic 310 enables communications with other TDP $110_2$-$110_3$ and management system 120 of FIG. 1. According to one embodiment of the disclosure, communication interface logic 310 may be implemented as a physical interface including one or more ports for wired connectors. Additionally, or in the alternative, communication interface logic 310 may be implemented with one or more radio units for supporting wireless communications with other electronic devices.

Processor(s) 300 is further coupled to persistent storage 340 via a second transmission medium 330. According to one embodiment of the disclosure, persistent storage 340 may include (a) static analysis engine 140, including de-obfuscation logic 142, reflection API analysis logic 144 and feature extraction logic 146; (b) the dynamic analysis engine 160 that includes the processing logic 161 and the virtual analysis environment 162 that includes VM(s) $163_1$-$163_M$, where at least some of the VM(s) $163_1$-$163_M$ include reflection hooking logic 165 and object feature extraction logic 167; (c) classification engine 180; (d) reporting engine 190; and/or (e) one or more data stores 350 that may be utilized by static analysis engine 140, dynamic analysis engine 160, classification engine 180, and/or reporting engine 190. One or more of these engines (or logic units) could be implemented externally from the first TDP $110_1$.

Collective logic within the static analysis engine 140 may be configured to de-obfuscate (e.g., decompile or disassemble) an object and obtain a higher level representation of the object than machine code, such as source code for example. Thereafter, the content of the source code is analyzed to determine if reflection operations would be invoked by the object when processed. After detection that the object would invoke reflection operations, the static analysis engine 140 provides the object under analysis or particular feature(s) associated with the object to the classification system for more in-depth analysis.

Additionally, or in the alternative, reflection can be identified by detecting function calls that invoke reflection operations, where the function calls may be directed to reflection APIs and/or system functions that invoke reflection operations. Hence, during processing of the object within the VM $163_1$ and detecting at least one of the function calls that invoke reflection operations, the dynamic analysis engine 160 is able to determine that the object is suspicious.

Hereafter, the classification engine 180 is configured to determine whether an object, which is previously determined as suspicious, is further determined to be malicious or non-malicious. The object is deemed "suspicious" based on a determination of the presence of API calls within content of the object or a detection, during virtual processing of the object, of the issuance of function calls (e.g., API calls, system calls, etc.) that invokes reflection operations. The classification engine 180 may conduct probabilistic model analysis and/or machine learning analysis on certain feature(s) extracted from the object after a prior analysis uncovered that the object is invoking reflection operations. The feature(s) may include, but are not limited or restricted to function names, file sizes, and/or other information potentially indicative of malware such as extract suspicious strings from the contents of the object if the object has been successfully decompiled.

When implemented as hardware circuitry, the static analysis engine 140 may be configured to be communicatively coupled to communication interface logic 310 and/or the classification engine 180. The dynamic analysis engine 160 may further be communicatively coupled to the communication interface logic 310, the static analysis engine 140, and/or the classification engine 180. The classification engine 180 is communicatively coupled to the reporting engine 190.

IV. Exemplary Threat Detection Based on Reflection

Figure 4:
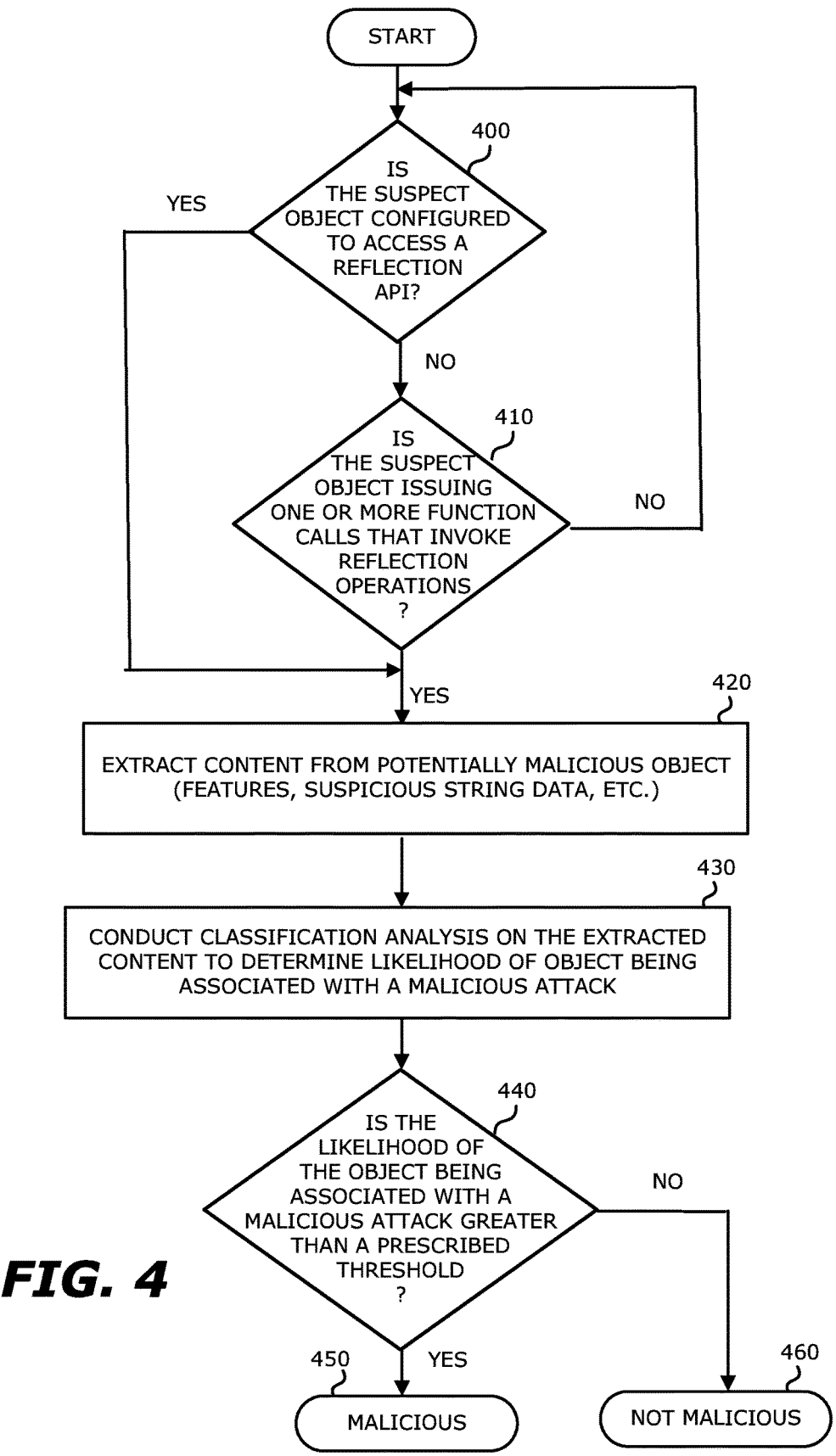
FIG. 4 is a general exemplary flowchart that illustrates operations conducted by one or more electronic devices for determining whether an object that invokes reflection operations is malicious.

Referring to FIG. 4, a general exemplary flowchart is shown that illustrates operations conducted by one or more electronic devices, such as a TDP or another type of platform, for determining whether a suspect object, which invokes reflection operations to obfuscate content or operability, is malicious. Upon receiving an object, an analysis is conducted to determine whether the suspect object is configured to access a reflection API (block 400). This may be determined by analyzing the de-obfuscated content associated with the object (e.g., the decompiled source code) for the presence of an API call that, at run-time, would invoke a reflection API. If the object includes such an API call, the object is deemed suspicious.

Additionally, or in the alternative, the behavior of the object may be monitored at run-time to detect whether the object is invoking reflection operations (block 410). For instance, this may be accomplished by setting interception points (e.g., hooks, breakpoints with subsequent activity after code execution halts, etc.) to detect one or more function calls resulting from processing the object within the virtual machine. One type of function call being monitored includes an API call directed to reflection API. Additionally, or in the alternative, another function call being monitored includes a system call that invokes reflection operations, where the system call may be based on an API call issued by the object.

In response to detecting that the object invokes reflection operations, content from the suspect object is extracted for further analysis (block 420). The content may include one or more features of the object under analysis, suspicious string data, or the like.

A classification analysis is conducted on the extracted content to determine the likelihood of the object, which invokes reflection operations, is associated with a malicious attack (block 430). According to one embodiment of the disclosure, the classification analysis may involve probabilistic model analysis and/or machine learning analysis to produce a result (e.g., a resultant score) that may be used to classify whether the object is malicious or not, as previously described. If the result is greater than a prescribed threshold, the suspect object is determined to be malicious (blocks 440 and 450). Otherwise, the suspect object is determined to be non-malicious (blocks 440 and 460).

Figure 5:
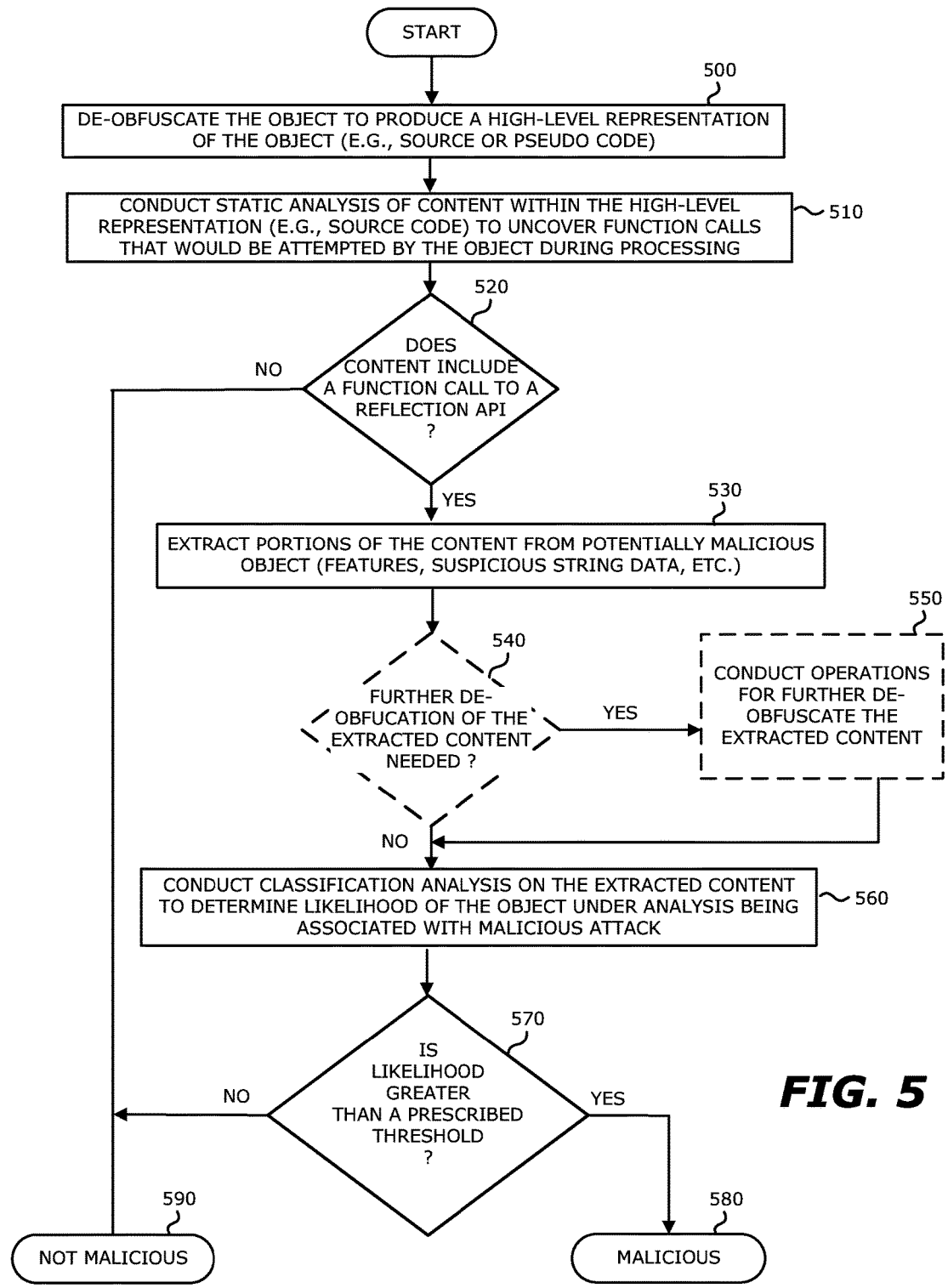
FIG. 5 is a first exemplary flowchart that illustrates operations collectively conducted by a static analysis engine and a classification system for determining whether an object invoking reflection operations is malicious.

Referring now to FIG. 5, a first exemplary flowchart is shown that illustrates operations conducted by the static analysis engine and the classification system collectively deployed within the TDP and/or external resources (e.g. cloud services). Upon receiving a suspect object, an analysis is conducted to determine whether the object is configured to invoke reflection operations. This analysis may involve de-obfuscating by decompiling and/or disassembling (or by emulation) at least part of the object to recover a high-level representation (e.g., source code, or pseudo-code or another high-level language), and thereafter, conducting an analysis of the content that is part of the high-level representation (e.g., at least a portion of the source code or pseudo-code) to determine whether the object would invoke reflection at run-time (blocks 500, 510 and 520). The object is considered to invoke reflection upon determining, by static analysis of the source code (or pseudo-code or another high-level language, that the code includes an API call to a reflection API.

If the de-obfuscated content of the suspect object fails to include an API call to a reflection API which is considered to be one of the triggering events for subsequent analysis, the analysis ends as the suspect object may be further analyzed through other malware detection schemes. However, in response to detecting that the suspect object is configured to access a reflection API for example, content from the suspect object is extracted for further analysis (blocks 520 and 530). The content may include one or more features of the suspect object (e.g., name of the reflection API, size of the suspect object, suspicious string data, or the like). Optionally, the static analysis engine may determine if the de-obfuscated (e.g., decompiled) high-level representation (e.g., source code, pseudo-code, or another high-level language) is further obfuscated, and if so, further operations are conducted to further de-obfuscate the high-level representation (blocks 540 and 550).

A classification analysis is conducted on the extracted content to determine the likelihood of the object being associated with a malicious attack (block 560). According to one embodiment of the disclosure, the classification analysis may involve probabilistic model analysis and/or machine learning analysis to produce a result that represents a likelihood of the object, which invokes reflection operations, is associated with a malicious attack, as previously described. If the result is greater than a prescribed threshold, the suspect object is determined to be malicious (blocks 570 and 580). Otherwise, the suspect object is determined to be non-malicious (blocks 570 and 590).

Figure 6:
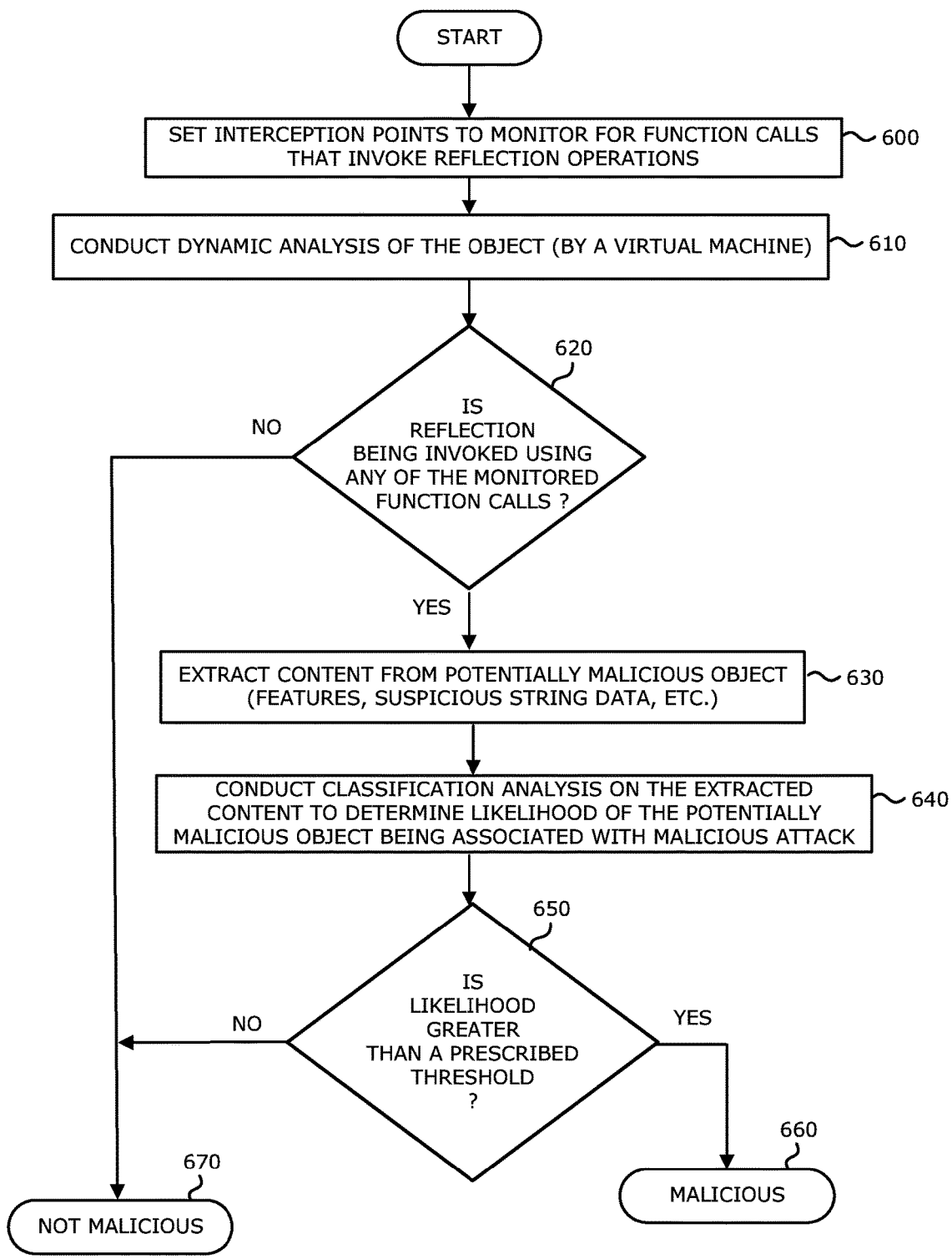
FIG. 6 is a second exemplary flowchart that illustrates operations collectively conducted by a dynamic analysis engine and a classification engine for determining whether an object that invokes reflection operations is malicious.

Referring to FIG. 6, a second exemplary flowchart is shown that illustrates operations conducted by the dynamic analysis engine and the classification system collectively deployed within the TDP and/or external resources (e.g. cloud services). Upon processing the suspect object within a configured virtual machine, based on one or more behaviors of the object during processing within the virtual machine, a determination is made whether the object is invoking reflection operations (blocks 600, 610 and 620).

In response to detecting that the object is invoking reflection operations, such as the object is attempting to access the reflection API for example, content from the object under analysis is extracted for further analysis (blocks 620 and 630). The content may include one or more features of the object, suspicious string data, or the like.

A classification analysis is conducted on the extracted content to determine the likelihood of the object being associated with a malicious attack (block 640). According to one embodiment of the disclosure, the classification analysis may involve probabilistic model analysis and/or machine learning analysis to produce a resultant score, as previously described. If the resultant score is greater than a prescribed threshold, the suspect object is determined to be malicious (blocks 650 and 660). Otherwise, the suspect object is determined to be non-malicious (blocks 650 and 670).

Figure 7:
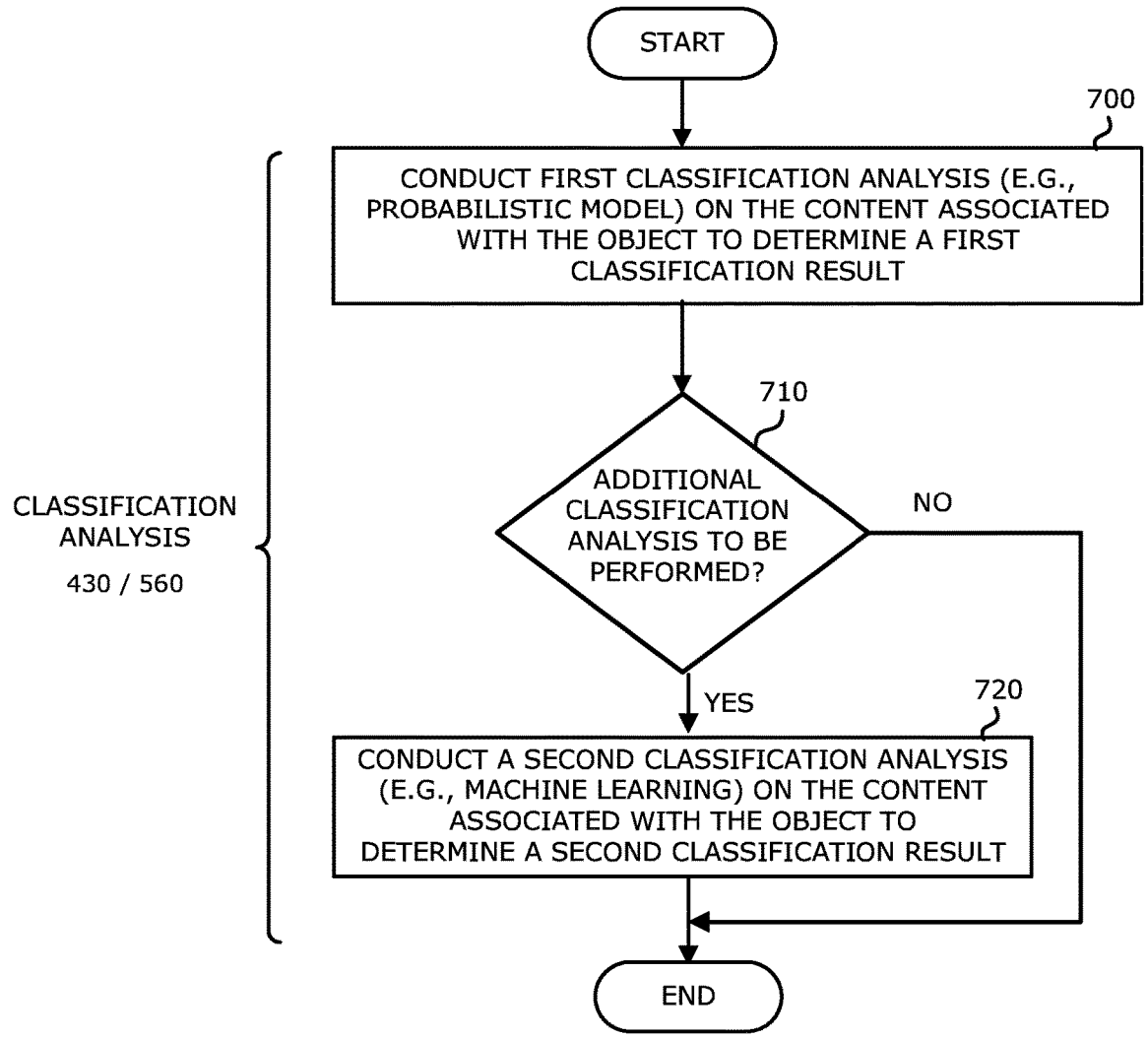
FIG. 7 is an exemplary flowchart of the operations of the classification analysis performed by the classification engine of FIGS. 1 and 2.

Referring now to FIG. 7, an exemplary flowchart of the operations of the classification analysis described in FIGS. 4-6 as performed by the classification system of FIGS. 1 and 2 is shown. Herein, the classification system performs a first classification analysis on the content of the object to determine a first classification result (block 700). According to one embodiment of the disclosure, the first classification analysis includes a probabilistic model analysis on contents of the object, namely an analysis on features and other data associated with the object in accordance with a decision-tree analysis as described above. Based on these features provided for analysis, a result (e.g., resultant score) is produced, which represents the likelihood of the object under analysis being associated with a malicious attack. According to another embodiment of the disclosure, the first classification analysis may feature a machine learning analysis on content of the object, namely comparing content associated with the object to content associated with known malware or known benign data. Based on these comparisons, a result (e.g., resultant score) is produced, which represents a likelihood that the object is associated with a malicious attack.

Next, a determination is made whether additional classification analysis is to be performed (block 710). If so, the classification system performs a second classification analysis on the content of the object to determine a second classification result (block 720). Where the first classification analysis is directed to a probabilistic model analysis of content associated with the object, the second classification analysis may feature a more detailed probabilistic model analysis or a machine learning analysis. Similarly, where the first classification analysis includes a machine learning analysis, the second classification analysis may feature a more detailed machine learning analysis or a probabilistic model analysis.

In the foregoing description, the invention is described with reference to specific exemplary embodiments thereof. For instance, some or all of the functionality of the static analysis engine, the dynamic analysis engine and the classification engine of FIG. 1 may be implemented within another type of network device, such as an endpoint device. It will, however, be evident that various modifications and changes may be made thereto without departing from the broader spirit and scope of the invention as set forth in the appended claims.

What is claimed is:
1. A computerized method comprising:
receiving, by a network device, an object for analysis;
conducting, by the network device, a first analysis to determine whether the object is configured to invoke reflection operations at run-time; and responsive to the network device determining that the object is configured to invoke reflection operations at run-time, conducting a second analysis within one or more virtual machines to determine whether the object is deemed to be malicious.

2. The computerized method of claim 1, wherein the object is deemed to be malicious if the second analysis determines that there exists a probability above a threshold probability that the object includes malware.

3. The computerized method of claim 1, wherein the reflection operations comprise examining and modifying run-time behavior of the object without knowledge of a class associated with the object.

4. The computerized method of claim 1, wherein the first analysis comprises de-obfuscating at least part of the object to produce a high-level representation of the object and analyzing the high-level representation of the object to determine whether the object is configured to issue a call to an Application Programming Interface that invokes the reflection operations.

5. The computerized method of claim 4, wherein the high-level representation of the object comprises source code that is produced during decompiling of the object.

6. The computerized method of claim 5, wherein the first analysis scans the source code to determine whether the source code includes an API function name for the Application Programming Interface that invokes the reflection operations.

7. The computerized method of claim 1, wherein the first analysis comprises decompiling an executable that is at least part of the object to produce source code associated with the object and analyzing the source code to determine whether an Application Programming Interface (API) function name for an API that invokes the reflection operations and is accessible by the object through an API call.

8. The computerized method of claim 1, wherein the first analysis comprises de-obfuscating at least a portion of content of the object and analyzing the de-obfuscated portion of the content to determine whether the de-obfuscated portion of the content of the object is configured to issue an Application Programming Interface call to an Application Programming Interface that invokes the reflection operations.

9. The computerized method of claim 1, wherein the second analysis comprises (1) analyzing one or more features of the object provided as input into a probabilistic modeling analysis that produces a score value for each feature provided as input, (2) computing an aggregate of the score values for each of the one or more features to computer an aggregated score value, and (3) determining whether or not the object is malicious based on the aggregated score value.

10. The computerized method of claim 1, wherein the second analysis comprises
analyzing one or more features of the object provided as input into a machine learning analysis, the machine learning analysis includes conducting a comparison of content within a first feature of the one or more features to known malicious patterns; and
determining that the object is malicious based on a matching of at least one known malicious pattern of the known malicious patterns to the content within the first feature of the one or more features.

11. The computerized method of claim 1, wherein the second analysis is conducted remotely from the network device.

12. A computerized method comprising:
receiving, by a network device, an object for analysis;
conducting, by the network device, a first analysis to determine whether, during processing of the object within a virtual machine, the object is issuing one or more function calls that invoke reflection operations; and
responsive to the network device determining that the object is issuing calls that invoke reflection operations, conducting a second analysis to determine whether the object is malicious.

13. The computerized method of claim 12, wherein the first analysis comprises detecting the one or more function calls that includes an Application Programming Interface (API) call to a reflection API.

14. The computerized method of claim 13, wherein the first analysis comprises setting at least one hook at the reflection API and, in response to the API call to the reflection API, redirecting information associated with the API call for use in the second analysis.

15. The computerized method of claim 13, wherein the reflection API comprises one of a getClass API and a Class.forname API.

16. The computerized method of claim 12, wherein the second analysis comprises (1) analyzing one or more features of the object provided as input into a probabilistic modeling analysis that produces a score value for each feature provided as input, (2) computing an aggregate of the score values for each of the one or more features to computer an aggregated score value, and (3) determining whether or not the object is malicious based on the aggregated score value.

17. The computerized method of claim 12, wherein the second analysis comprises
analyzing one or more features of the object provided as input into a machine learning analysis, the machine learning analysis includes conducting a comparison of content within a first feature of the one or more features to known malicious patterns; and
determining that the object is malicious based on a matching of at least one known malicious pattern of the known malicious patterns to the content within the first feature of the one or more features.

18. A network device comprising:
a communication interface configured to receive an incoming object, the communication interface includes a connector adapted for coupling to a wired communication medium;
a static analysis engine communicatively coupled to the communication interface, the static analysis engine to receive the object and perform a first analysis of the object, the first analysis determines whether the object is configured to invoke reflection operations at run-time; and
a classification system communicatively coupled to the static analysis engine, the classification system, in response to the static analysis engine determining that the object is configured to invoke reflection operations at run-time, conducts a second analysis by processing the object within one or more virtual machines to determine whether the object is malicious.

19. The network device of claim 18, wherein the object is deemed to be malicious by the classification system if the second analysis determines that there exists a probability above a threshold probability that the object includes malware.

20. The network device of claim 18, wherein the static analysis engine performs the first analysis by at least decompiling at least part of the object to produce code and analyzing the code to determine whether the object is configured to issue a function call that invokes reflection operations.

21. The network device of claim 20, wherein the function call comprises an API call to a reflection API that invokes the reflection operations.

22. The network device of claim 18, wherein the classification system performs the second analysis by at least analyzing features of the object based on a decision-tree analysis, each of the features is assigned a score value in accordance with the decision-tree analysis and an aggregate of the score values for the features identifies whether or not the object is malicious.

23. The network device of claim 18, wherein the classification system performs the second analysis by at least (1) analyzing one or more features of the object provided as input into a machine learning analysis, the machine learning analysis includes conducting a comparison of content within a first feature of the one or more features to known malicious patterns, and (2) determining that the object is malicious based on a matching of at least one known malicious pattern of the known malicious patterns to the content within the first feature of the one or more features.

24. A network device comprising:
a communication interface configured to receive an incoming object, the communication interface includes one of (i) a connector adapted for coupling to a wired communication medium or (ii) a radio unit with one or more antennas for wireless connectivity for receiving the incoming object;
a dynamic analysis engine communicatively coupled to the communication interface, the dynamic analysis engine to receive the object and perform a first analysis of the object, the first analysis determines, during processing of the object within a virtual machine, whether the object is invoking reflection operations based on one or more function calls; and
a classification system communicatively coupled to the static analysis engine, the classification system, in response to the static analysis engine determining that the object invoking reflection operations, conducts a second analysis to determine whether the object is malicious.

25. A non-transitory storage medium including software that, when executed by a processor implemented with a network device, causes the network device to detect within an object under analysis is associated with a malicious attack by performing operations comprising:
conducting at least one of (1) a first analysis to determine whether an object received for analysis is configured to invoke reflection operations at run-time and (2) a second analysis to determine, during processing of the object within a virtual machine, whether the object is issuing one or more function calls that invoke reflection operations; and
responsive to the network device determining that the object is configured to invoke reflection operations at run-time, conducting a third analysis to determine whether the object is malicious.

* * * * *